(12) United States Patent
Butler et al.

(10) Patent No.: US 12,450,147 B2
(45) Date of Patent: Oct. 21, 2025

(54) COMPILER FAILURE TESTING FOR VEHICLE SOFTWARE

(71) Applicant: GM Cruise Holdings LLC, San Francisco, CA (US)

(72) Inventors: Brian Butler, Brookline, NH (US); Courtney Jean Lewis, Herndon, VA (US); Daniel J. Krause, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 192 days.

(21) Appl. No.: 18/174,191

(22) Filed: Feb. 24, 2023

(65) Prior Publication Data

US 2024/0289253 A1    Aug. 29, 2024

(51) Int. Cl.
*G06F 11/362*    (2025.01)
*G06F 11/3668*    (2025.01)

(52) U.S. Cl.
CPC ...... *G06F 11/3624* (2013.01); *G06F 11/3696* (2013.01)

(58) Field of Classification Search
CPC .......................... G06F 11/3624; G06F 11/3696
See application file for complete search history.

(56) References Cited

U.S. PATENT DOCUMENTS

2014/0229916 A1*   8/2014   Bates ................... G06F 11/362
                                                717/124
2022/0327046 A1*   10/2022   Yamamoto .......... G06F 11/3692

FOREIGN PATENT DOCUMENTS

CN           113836023 B   *   6/2023
DE          102020111051 A1   *   10/2021
DE          102021132302 A1   *   6/2023         G06F 8/41

* cited by examiner

*Primary Examiner* — Phillip H Nguyen
(74) *Attorney, Agent, or Firm* — Honigman LLP; Matthew H. Szalach; Jonathan P. O'Brien (57) ABSTRACT

Compiler failure testing is used to test compilers for compiling software where a high degree of reliability is required, e.g., compilers for software that runs on automobiles. A compiler failure testing system includes tests for testing different coding rules. When a change is made to a software compiler, the failure testing system tests the software compiler's response to the tests. If the software compiler is enforcing prescribed coding rules (e.g., AUTOSAR and/or MISRA rules), the software compiler fails to compile the tests and returns an error message. If the software compiler successfully compiles a test, this indicates that the software compiler is not enforcing all of the prescribed coding rules. In this case, developers can be alerted to make needed changes to the software compiler, so that the software compiler properly enforces the coding rules.

20 Claims, 6 Drawing Sheets

COMPILER FAILURE TESTING FOR VEHICLE SOFTWARE

BACKGROUND

1. Technical Field

The present disclosure generally relates to compiling software and, more specifically, to failure testing for a software compiler for vehicle applications.

2. Introduction

An autonomous vehicle (AV) is a motorized vehicle that may navigate without a human driver. An exemplary AV may include various sensors, such as a camera sensor, a light detection and ranging (LIDAR) sensor, and a radio detection and ranging (RADAR) sensor, among others. The sensors collect data and measurements that the AV may use for operations such as navigation. The sensors may provide the data and measurements to an internal computing system of the AV. The computing system may execute software that uses the data and measurements to control a mechanical system of the AV, such as a vehicle propulsion system, a braking system, or a steering system.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs use a mix of hardware and software to accomplish navigating and driving tasks without a human driver. AVs include computing circuitry in one or more processing units, such as central processing units (CPUs) and/or graphical processing units (GPUs), which run software for processing data and controlling the AV. AVs typically include a variety of sensors to perceive their environment, including RADAR, LIDAR, and cameras. These sensors provide a 360-degree view of the AV's surroundings. The sensor data is provided to computing circuitry (e.g., the CPU or GPU), which runs perception software that processes the sensor data and detects pedestrians, other vehicles, and other objects in the AV's environment. This sensor data and/or additional sensor data, such as a global positioning system (GPS) sensor, accelerometer data, etc., can be used by localization software executing on computing circuitry to determine a precise location of the AV. The AV's computing circuitry may further execute path planning software, which uses the sensor data and AV location to plan a path for the AV to follow. The AV's computing circuitry may also execute control software that generates instructions to control the vehicle's acceleration, braking, and steering based on the planned path, allowing the AV to navigate its environment and avoid any detected obstacles.

The various software components are programmed by software developers in a high-level programming language, such as C, C++, Java, JavaScript, or Python. To execute software on computing circuitry (e.g., a CPU or GPU), source code written in the high-level programming language is first translated into machine code by a compiler. The compiler may be one component of a build toolchain, which is a set of software tools that build, test, and package software projects.

Compilers often verify syntax and semantics of a software program prior to compiling the program. If the compiler detects an error in the source code, the compiler may fail to compile the program. The compiler may provide an error message indicating the type of error and/or a location in the source code where the error was detected. For example, if the program has a reference to a software library, but the compiler cannot find the library, this can prevent the compiler from compiling the program. The compiler may provide an output indicating that compiling was not successful and that there was an error locating the library. In some cases, the compiler may be able to compile the program, but the compiler outputs a warning if it detects something that may lead to a problem during execution of the software. For example, a compiler may issue a warning if a variable is not used in the program, or if a function is defined but is not called.

Different compilers may implement different rules for issuing errors or warnings. For example, one compiler may not compile a program, and instead output an error message, if a variable is defined but not used in the program. A different compiler may compile the program but output a warning. A third compiler may compile the program and not issue a warning.

In certain environments, multiple build toolchains with different compilers may be used for different applications. For example, different compilers may be used to compile programs to run on different types of computing hardware.

For example, a first compiler may generate machine code to run on a CPU, and a second compiler may generate machine code to run on a GPU. In some cases, the same piece of software may be compiled by different compilers depending on the application. For example, a first compiler may generate machine code for an x86-based processor, and a second compiler may generate machine code for an ARM-based processor. If different compilers are used, compiling the same program may lead to different results, e.g., the first compiler may detect an issue and not compile the program, while the second compiler may compile the program (in spite of the issue).

In an AV context, a software program for controlling AVs may be executed by different hardware systems. For example, two types of AVs running the same software may have different processor types, e.g., one type of AV in an AV fleet may be equipped with an x86-based processor, while another type of AV in the same AV fleet running the same AV software may be equipped with an ARM-based processor. A single AV may also have multiple different types of processors, e.g., a combination of different types of CPUs, or a combination of one or more CPUs and one or more GPUs. Thus, an AV developer may rely on multiple build toolchains to generate different executable files for different types of hardware. This can lead to differing outcomes when software is compiled. If a first compiler is less stringent than a second, the first compiler may compile software that can potentially encounter errors during runtime.

In AV contexts, it is important for software for controlling AV behavior to function as expected. Various standards, including AUTOSAR (AUTomotive Open System ARchitecture) and MISRA (Motor Industry Software Reliability Association), to promote reliability in automotive software have been developed. As described above, compilers can enforce coding rules, e.g., by refusing to compile a program that does not follow certain rules, and outputting error messages to programmers. Following such standards or other coding rules can prevent undefined or unanticipated behavior in AV software. However, software updates to the compiler can change whether or how these coding rules are enforced. It can be especially difficult to ensure that each compiler behaves as expected in an environment where multiple compilers are used.

Systems and methods of performing compiler failure testing are described herein. The failure testing described herein can be used for vehicle software, and in particular, to test compilers used to compile software used for vehicle applications, e.g., programs executed by AVs. In some cases, the failure testing described herein may be used to test compilers for other applications in which a high level of reliability is required.

A system for compiler failure testing may include one or more tests, e.g., a test bank with multiple different tests including sample software code for testing different coding rules. When a change is made to a software compiler, or a new software compiler is introduced into a software development environment, the failure testing system tests the software compiler's response to the tests. If the software compiler is enforcing prescribed coding rules (e.g., AUTOSAR and/or MISRA rules), the software compiler fails to compile the tests and returns an error message. If the software compiler successfully compiles a test, this indicates that the software compiler is not enforcing all of the prescribed coding rules. In this case, developers can be alerted to make needed changes to the software compiler, so that the software compiler properly enforces the coding rules. Failure testing the software compiler ensures that, when the software compiler compiles software to run on a vehicle, the software compiler prevents software that does not adhere to the prescribed coding rules from running on the vehicle.

The failure testing procedure described herein can be automated so that the failure testing is performed each time a change to a software compiler is detected, or any time a change to a build toolchain is detected. As noted above, in a given software development environment, multiple build toolchains can be used, e.g., to generate machine code for different types of hardware, or to generate machine code from different high-level programming languages. Developers working on the software environment may make frequent changes to each of the build toolchains. As build systems become increasingly complex, and with multiple build toolchains being used within a software development environment, it can be difficult to maintain reliability within every build toolchain. The failure testing described herein ensures that each build toolchain in the software development environment continues to enforce the coding rules, resulting in reliable machine code.

Example Build Toolchain

A build toolchain is a set of software tools that are used to build, test, and package software projects. In general, a build toolchain receives the source code of a software project and turns the source code into a deployable, executable software package. In a vehicle context, the build toolchain receives source code for software that runs on a vehicle and generates a software package that can be executed by hardware on the vehicle, e.g., an onboard CPU. The specific components of a build toolchain can vary across different development environments or development projects. Build toolchains may include, for example, a compiler, a linker, an assembler, a build automation tool, a version control system, a debugger, a test runner, and a package manager.

Figure 1:
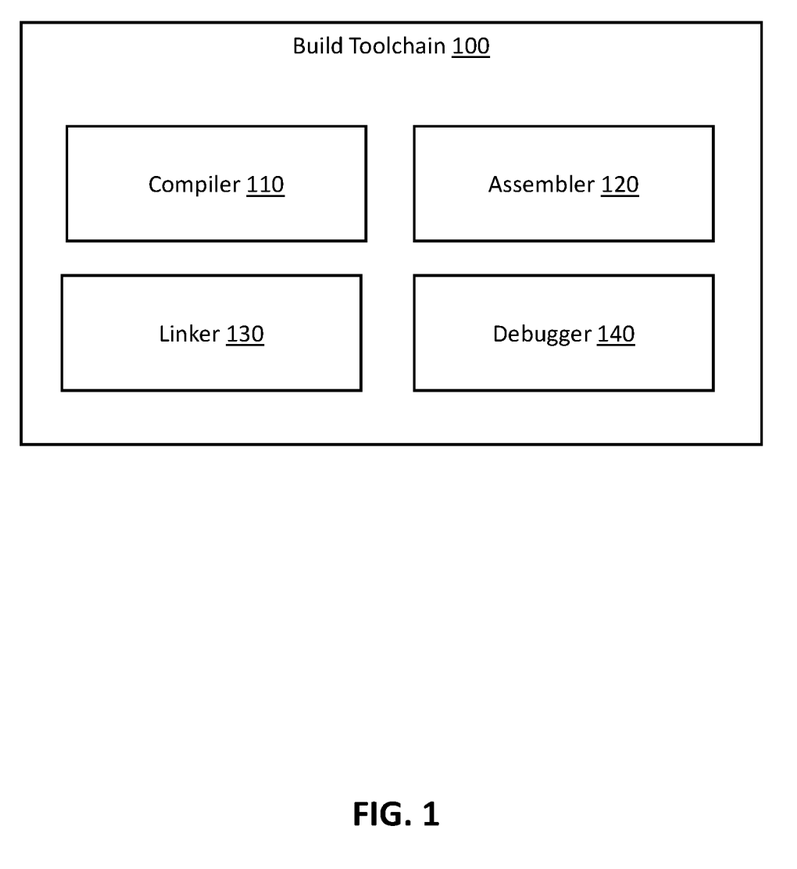
FIG. 1 illustrates an example build toolchain for software, according to some examples of the present disclosure.

FIG. 1 illustrates components of one example build toolchain 100, according to some examples of the present disclosure. The build toolchain 100 includes a compiler 110, an assembler 120, a linker 130, and a debugger 140. The build toolchain 100 may include additional components not shown in FIG. 1, e.g., any of the components mentioned above.

The compiler 110 converts source code written in a high-level programming language (e.g., C, C++, Java, JavaScript, Python, etc.) into lower-level code. In the example shown in FIG. 1, the compiler 110 generates assembly language code that is further processed by the assembler 120, as described below. Assembly language is a representation of machine code that can be interpreted and written by humans, but assembly language is closer to the native instruction set of the computer than higher-level programming languages. In other embodiments, the compiler 110 may generate machine code that can be executed by a computer.

The process of compiling typically involves several steps, including preprocessing, lexical analysis, parsing, semantic analysis, code generation, and optimization. The compiler 110 may have sub-components (e.g., software modules) for performing each of these steps, e.g., a preprocessor, a lexical analyzer, a parser, a semantic analyzer, a code generator, and an optimizer. The preprocessor may expand any preprocessor directives, such as #include statements, and may remove comments from the source code. The lexical analyzer may break the source code down into a sequence of tokens, which are the smallest units of meaning in the source code. The parser may build a syntax tree from the tokens; the syntax tree represents the structure of the source code. The semantic analyzer may check the source code for errors and determine the meaning of the various elements of the source code. The code generator may generate a lower-level code (e.g., assembly language code, in this example, or machine code) from the syntax tree. Finally, the optimizer may make the code generated by the code generator more efficient by applying various optimization techniques. The output of the compiler 110 is provided to the assembler 120 for translation into machine code.

The assembler 120 translates the assembly language files output by the compiler 110 into machine code. Using the compiler 110 and assembler 120 in a two-step process to generate the machine code may allow developers to take advantage of the benefits of both high-level programming languages and assembly language when developing software. The output of the assembler 120 is an object file, which contains machine code and other information, such as a symbol table and relocation information. The object file is output to the linker 130. As noted above, in other embodiments, the compiler 110 directly generates an object file including the machine code, and the assembler 120 is not included in the build toolchain 100.

The linker 130 receives object files from the assembler 120. In other embodiments where the compiler 110 directly generates machine code and the assembler 120 is not included, the linker 130 may receive object files directly from the compiler 110. For a given software project, the compiler 110 and assembler 120 may produce multiple object files, each of which are output to the linker 130. The linker 130 combines the object files and resolves any symbols to create an executable program. The symbols may be references to functions or variables defined in other object files; the linker 130 replaces the symbols with the addresses of the actual definitions. The linker 130 may perform other tasks, such as adding any runtime libraries to the executable file and resolving any external dependencies in the code. The output of the linker 130 is an executable file that can be run on computing circuitry, e.g., on a CPU or a GPU.

The debugger 140 is a software tool that allows developers to execute a program in a controlled environment and examine the state of the program as it is running. The debugger 140 may provide the ability to pause the execution of the program, inspect variables and expressions, and step through the code line by line. The debugger 140 can be used to identify and fix bugs in the program. The debugger 140 can allow developers to understand what is happening in their code and why it is not behaving as expected, which can be particularly important when dealing with complex systems.

The build toolchain 100 can enforce coding rules. For example, the compiler 110 may not compile a program that does not follow certain rules. Specifically, the semantic analyzer of the compiler 110 may check the source code for errors; the semantic analyzer may determine not to compile the code if certain types of errors are detected. If compiling fails, the build toolchain 100 (e.g., the compiler 110) may output an indicating that compiling was not successful to the developer who submitted the code to the build toolchain 100. The output from the compiler 110 may further include an error message describing the error, e.g., the particular rule that the code did not follow, and a location within the code where the error was detected. In some cases, the developer may use the debugger 140 to assist in identifying problems in the code and correcting the code. In some cases, e.g., for certain types of minor errors, the semantic analyzer may determine that the compiler 110 can still compile the code, but the compiler 110 may output a warning. As described above, for applications in which a high degree of software reliability is needed, such as automotive applications, compiling code even if it has errors may be undesirable.

As noted above, a compiler 110 may be programmed to enforce rules of different standards or guidelines for automotive software, e.g., AUTOSAR and MISRA. AUTOSAR provides a common framework for the development of automotive software that can be used across different car models and brands. The AUTOSAR standard defines a set of rules and guidelines for the structure, behavior, and interface of automotive software components, as well as a set of tools and methods for developing and testing such components. The AUTOSAR rules are intended to promote reliability and efficiency in automotive software, and to facilitate the integration of new technologies into automotive systems.

MISRA is a set of software development guidelines specific to the C programming language that are used in the automotive industry. The MISRA guidelines are intended to help developers create safe and reliable software for use in automotive systems. The MISRA guidelines cover, for example, naming conventions, coding style, data types, and control structures. They are designed to help prevent common programming errors and to ensure that the software follows accepted practices for safety and reliability.

A particular build toolchain 100 may be tailored to a specific context, e.g., to generate machine code for a specific type of computing circuitry. As noted above, a first build toolchain may create machine code for an ARM-based processor. This build toolchain may use an ARM compiler or a Clang compiler, for example. A second build toolchain may create machine code for an x86-based processor. This build toolchain may use an Intel C++ Compiler or a GNU Compiler Collection (GCC), for example. A third build toolchain may create machine code for a GPU. This build toolchain may use NVIDIA's nvcc compiler, an OpenCL compiler, or an AMD Heterogeneous Systems Architecture (HSA) compiler, for example. As another example, a particular build toolchain 100 may be used for compiling a specific programming language. For example, one build toolchain may generate machine code based on C++ source code, while another build toolchain generates machine code based on Java source code. Each of the build toolchains may have a similar set of components, e.g., each of the components 110-140 shown in FIG. 1.

Example Development Environment for Automotive Software

Figure 2:
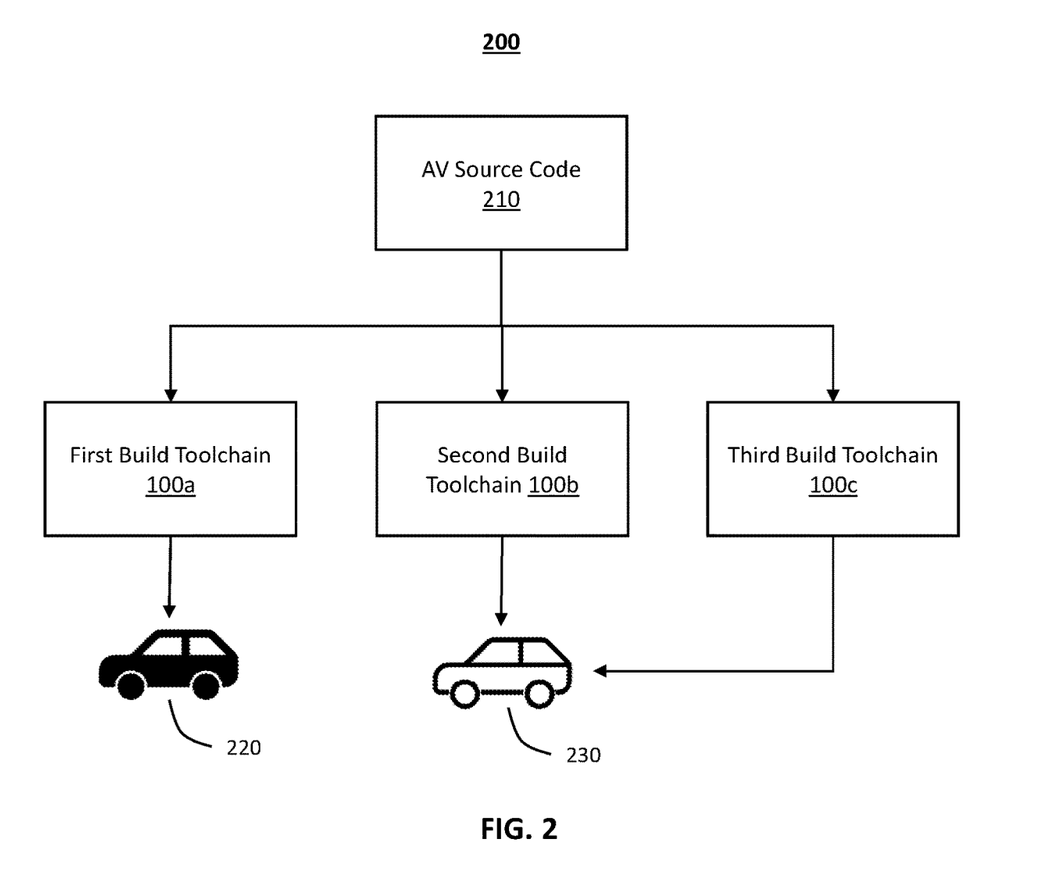
FIG. 2 illustrates an example development environment for automotive software, according to some examples of the present disclosure.

FIG. 2 illustrates an example set of build toolchains for vehicle applications, according to some examples of the present disclosure. In this example, a single source of AV source code 210 is processed by three different build toolchains 100*a*, 100*b*, and 100*c*, for execution on two different types of vehicles, referred to as vehicle 220 and vehicle 230. Each of the build toolchains 100*a*, 100*b*, and 100*c* is an example of the build toolchain 100 described with respect to FIG. 1. Each of the vehicles 220 and 230 may be examples of the AV 602, described in detail with respect to FIG. 5. As described in FIG. 5, each AV 602 includes a local computing device 610. The local computing device 610 includes one or more processors and memory. The memory stores instructions for execution by the one or more processors, e.g., an executable file output by a build toolchain 100.

In this example, the two vehicles 220 and 230 may include different hardware, and in particular, may include different computing devices. For example, the vehicle 220 includes a first type of computing circuitry, e.g., an x86-based processor, and the vehicle 230 includes a second type of computing circuitry, e.g., an ARM-based processor. In this example, the vehicle 230 may further include a third type of computing circuitry, e.g., a GPU. GPUs are computing devices designed for parallel processing. In AV contexts, GPUs may increase speed and efficiency at certain tasks that involve parallel processing, e.g., to process large amounts of sensor data in parallel, or to perform complex computations more efficiently. In general, GPUs were developed to accelerate rendering of graphics. Over time, GPUs have become more flexible and programmable, and can be used across a wide range of applications, not limited to graphics and video rendering. For example, GPUs can be used to accelerate workloads in artificial intelligence (AI), high performance computing (HPC), deep learning, image recognition, and other applications that can take advantage of the highly parallel nature of GPUs.

The vehicles 220 and 230 may have other hardware differences, e.g., the vehicles 220 and 230 may include different types of sensors, different numbers of sensors, different communications capabilities, etc. In some embodiments, the vehicles 220 and 230 may run at least some of the same software, e.g., the vehicles 220 and 230 may run executable files generated from the same source code. For example, certain software stacks or software components may run on both the ARM-based processor of the vehicle 230 and the x86-based processor of the vehicle 220. In some embodiments, at least some portions of the software running on vehicles 220 and 230 may be different, e.g., the vehicle 220 may have a software component to process data from one type of sensor, and the vehicle 230 does not have that sensor and does not have the associated software component.

As noted above, different build toolchains may be used to generate executable files for specific types of computing circuitry, e.g., for the different types of computing circuitry in the vehicles 220 and 230. In this example, a first build toolchain 100a processes the source code 210 (or some portion of the source code 210) to generate an executable file to run on the vehicle 220, e.g., to run on the x86-based processor. The second build toolchain 100b processes the source code 210 (or some portion of the source code 210) to generate an executable file to run on the vehicle 230, e.g., to run on the ARM-based processor. In this example, a third build toolchain 100c also processes the source code 210 (e.g., a second portion of the source code 210 different from the portion processed by the second build toolchain 100b) to generate a second executable file to run on the vehicle 230. This executable file may be executed by a third type of computing circuitry, e.g., a GPU.

The environment illustrated in FIG. 2 is one example of how different build toolchains may be used to compile a set of source code for different vehicles. As another example, the vehicle 220 may also include a GPU, and the vehicle 220 also receives machine code from the third build toolchain 100c. As a further example, a vehicle (e.g., vehicle 230) may execute a first software component developed using a first programming language (e.g., C) and a second software component developed using a second programming language (e.g., Java). The second build toolchain 100b may generate the machine code for the first software component, and the third build toolchain 100c may generate the machine code for the second software component.

Example Compiler Testing System

Figure 3:
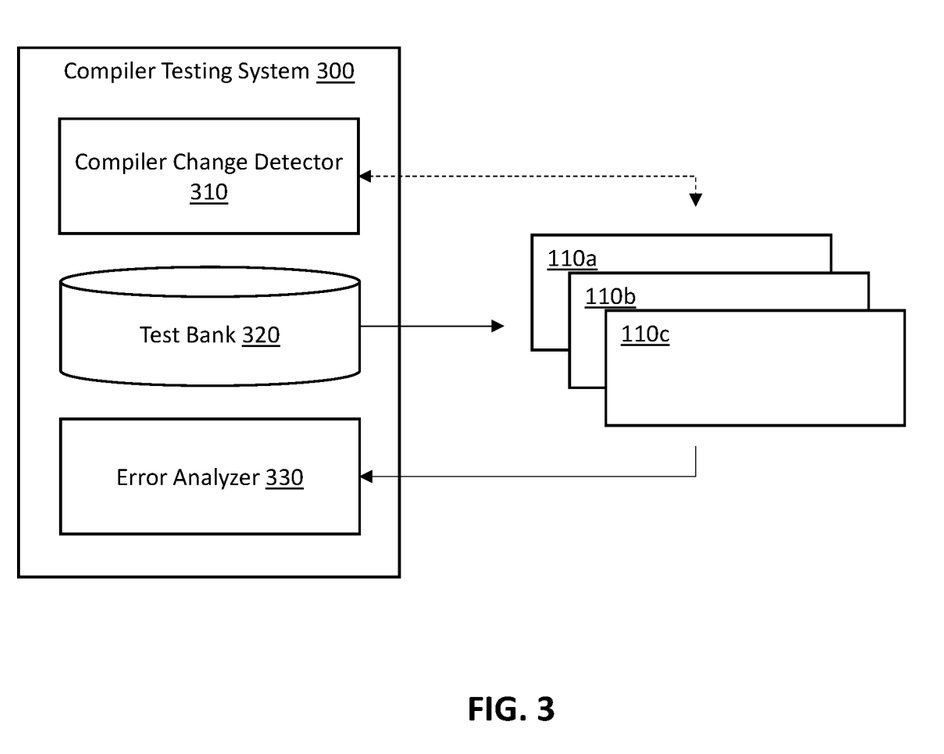
FIG. 3 illustrates an example compiler testing system, according to some examples of the present disclosure.

FIG. 3 illustrates an example compiler testing system 300, according to some examples of the present disclosure. The compiler testing system 300 includes a compiler change detector 310, a test bank 320, and an error analyzer 330. The compiler change detector 310 and the error analyzer 330 are each software programs or modules running on computing circuitry, e.g., in a software development environment. The test bank 320 is stored in a memory. The compiler testing system 300 interacts with the compilers in a given software development environment, e.g., the compilers 110a, 110b, and 110c of the build toolchains 100a, 100b, and 100c illustrated in FIG. 2. In some embodiments, a build toolchain used to compile the compilers 110 may include the compiler testing system 300.

The compiler change detector 310 detects changes in any of the compilers 110a, 110b, and 110c. Observation of the compilers 110 by the compiler change detector 310 is indicated by the dashed line in FIG. 3. For example, the compiler change detector 310 may store data describing a current version of each compiler 110 (e.g., version number, release date) and detect whether the version of each compiler 110 has changed. As another example, the compiler change detector 310 may detect changes within the code of each compiler 110. The compiler change detector 310 may automatically check attributes of the compilers 110 on a periodic basis, e.g., daily, hourly, each minute, etc.

In some embodiments, the compiler change detector 310 may more generally detect changes in a build toolchain 100, e.g., any of the build toolchains 100a, 100b, and 100c. In some cases, because the compiler 110 interacts with other components of the build toolchain 100, changes to other components of the build toolchain 100 may affect aspects or operations of the compiler 110, and the compiler testing system 300 may perform compiler failure testing responsive to any change in a build toolchain 100.

In some examples, the compiler change detector 310 is not included. For example, if a developer makes a change to a compiler 110, the developer may submit the new compiler code to the compiler testing system 300, and in response, the compiler testing system 300 performs failure testing of the new version of the compiler 110. For example, before releasing a new version of a compiler, a developer may submit the new version to the compiler testing system 300 for failure testing. As another example, the compiler testing system 300 may perform periodic testing of each compiler 110 in the software development environment, e.g., hourly or daily failure testing.

In response to the compiler change detector 310 detecting a compiler change, or the compiler testing system 300 otherwise determining to perform compiler failure testing, the compiler testing system 300 submits a test from the test bank 320 to one or more compilers 110. For example, if the compiler change detector 310 detects a change to the compiler 110a, the compiler testing system 300 submits one or more tests from the test bank 320 to the compiler 110a, to test whether the compiler 110a successfully compiles the software code in the one or more tests. The tests in the test bank 320 may each be designed to fail, i.e., each test breaks one or more coding rules, and if a compiler 110 is behaving properly, the compiler 110 fails to compile each of the tests. For example, a first test may be a piece of software code having an uninitialized variable. A second test may be a piece of software code having a variable that is defined in multiple places. A third test may be a piece of software code having a function that is defined in multiple places. A fourth test may be a piece of software code that includes a function that is not called. A fifth test may be a piece of software code that includes a variable that is defined but is not used.

As noted above, if a compiler 110 fails to compile source code, the compiler 110 may output an error message. The error messages are returned to the compiler testing system 300, and the error messages are received by an error analyzer 330. The error analyzer 330 analyzes the error messages to determine whether the compiler 110 failed to compile each of the tests as expected. If the compiler 110 provides a reason for the failure (e.g., a particular coding rule that was violated), the error analyzer 330 may confirm that the reason provided by the compiler 110 matches the goal of the test. For example, if a test includes an uninitialized variable, the error analyzer 330 may determine that the error code indicates that the uninitialized variable rule was violated. If the error code does not indicate the expected error, the error analyzer 330 may output an alert to a developer or development team.

As another example, if the compiler 110 provides a location of a detected error (e.g., a line of code where the error was detected), the error analyzer 330 may confirm that the location matches the location in the test code. If the error information does not indicate the expected location, the error analyzer 330 may output an alert to a developer or development team.

If the compiler 110 successfully compiles a test that is intended to fail, the error analyzer 330 may output an alert to a developer or development team. The alert may indicate the test (e.g., a name of the test file, or a link to the test file in the test bank 320) and/or a description of the coding rule tested by the test that successfully compiled.

If the error analyzer 330 determines that a compiler 110 is not properly enforcing the coding rules, the compiler testing system 300 may revert the compiler 110 to a prior version, or instruct the compiler 110 or build toolchain 100 to revert to a prior version. For example, the compiler change detector 310 may identify the latest version of the compiler 110 that enforced the coding rules tested by the test bank 320, and the compiler change detector 310 instructs the build toolchain 100 to revert to the identified version of the compiler 110.

While the compiler testing system 300 submits tests to compilers 110, in other embodiments, a similar testing system may submit tests (e.g., the tests in the test bank 320) to other software tools, including one or more other elements of the build toolchain 100 (e.g., the linker 130 or a static analyzer). The software tool receiving the test can provide an output that is analyzed by an error analyzer in a similar manner to the error analyzer 330. For example, a static code analysis tool may perform some similar tasks to the compilers 110 (e.g., the static code analysis tool may create a representation of the code that is similar to the representation created by the compiler 110, and then run tests on the representation of the code). The tests in the test bank 320 can be submitted to the static code analysis tool, which can provide a similar test output as the compilers 110 described above to the error analyzer 330.

Example Compile Failure Testing Process

Figure 4:
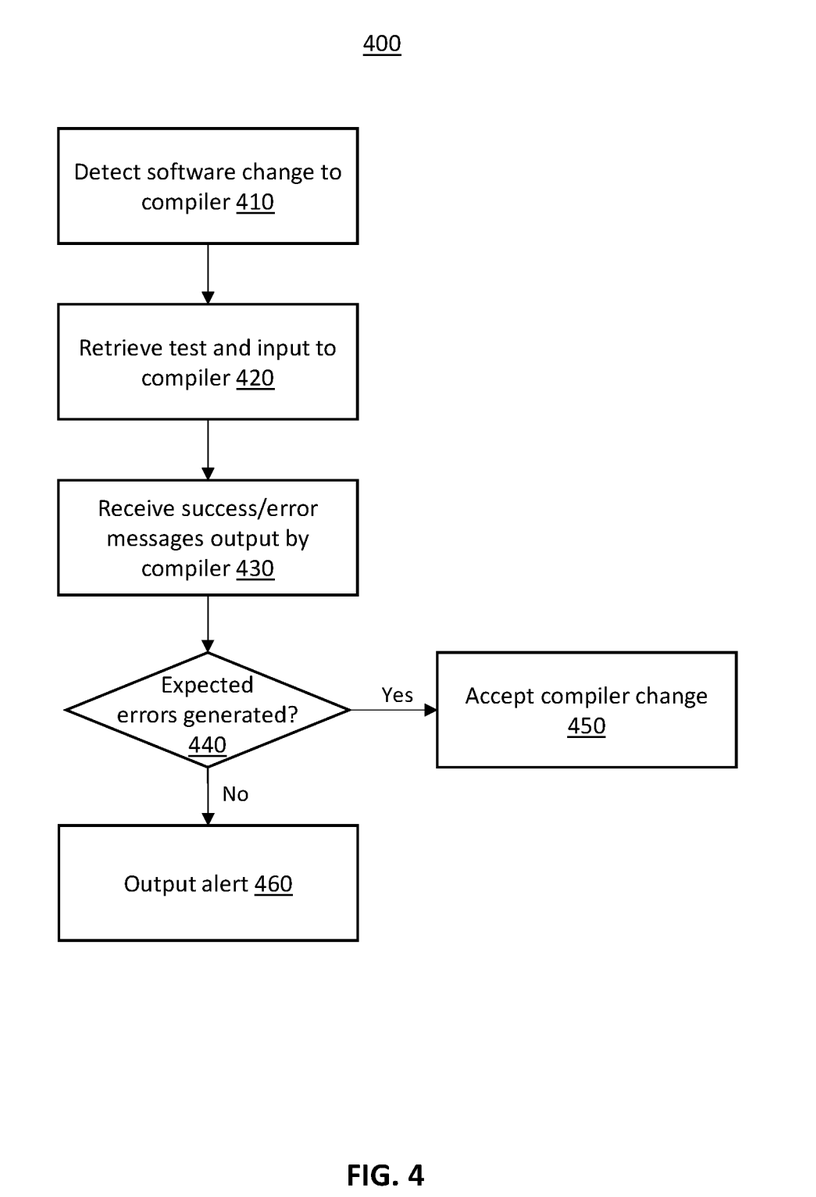
FIG. 4 illustrates an example process for compile failure testing, according to some examples of the present disclosure.

FIG. 4 illustrates an example process for compile failure testing, according to some examples of the present disclosure. The compiler testing system 300 (e.g., the compiler change detector 310) detects 410 a software change to a compiler, e.g., one of the compilers 110a-110c of one of the build toolchains 100a-100c. The compiler testing system 300 retrieves 420 a test (e.g., from the test bank 320) and inputs the test to the compiler 110 for which the software change was detected. If the test bank 320 includes multiple tests (e.g., multiple pieces of software code for testing different coding rules), the compiler testing system 300 may retrieve each of the tests and input each of the tests to the compiler 110.

The compiler testing system 300 receives 430 compiler messages output by the compiler 110. The compiler 110 may output a message indicating that the compiler 110 successfully compiled the code, e.g., if the compiler 110 detected no errors and was able to complete compiling. Alternatively, the compiler 110 may output one or more compiler errors and/or a message indicating that compiling failed if the compiler 110 detected errors and was not able to compile the code. In some cases, the compiler 110 may output a message indicating that the compiler 110 compiled the code but found potential issues, which the compiler 110 may output as warnings.

The compiler testing system 300 (e.g., the error analyzer 330) determines 440 whether the expected compiler errors were generated by the compiler 110, e.g., whether the compiler 110 did not compile the test, and whether the compiler 110 generated any expected error messages. If the expected compiler errors were generated, e.g., if the compiler 110 did not compile each of the tests, the compiler testing system 300 accepts 450 the software change to the compiler. On the other hand, if one or more of the expected compiler errors were not generated, e.g., if the compiler 110 successfully compiles one of the tests, the compiler testing system 300 outputs 460 an alert. The compiler testing system 300 may reject the compiler change and/or revert the compiler 110 to a prior version, as described with respect to FIG. 3.

Example AV and AV Management System

Figure 5:
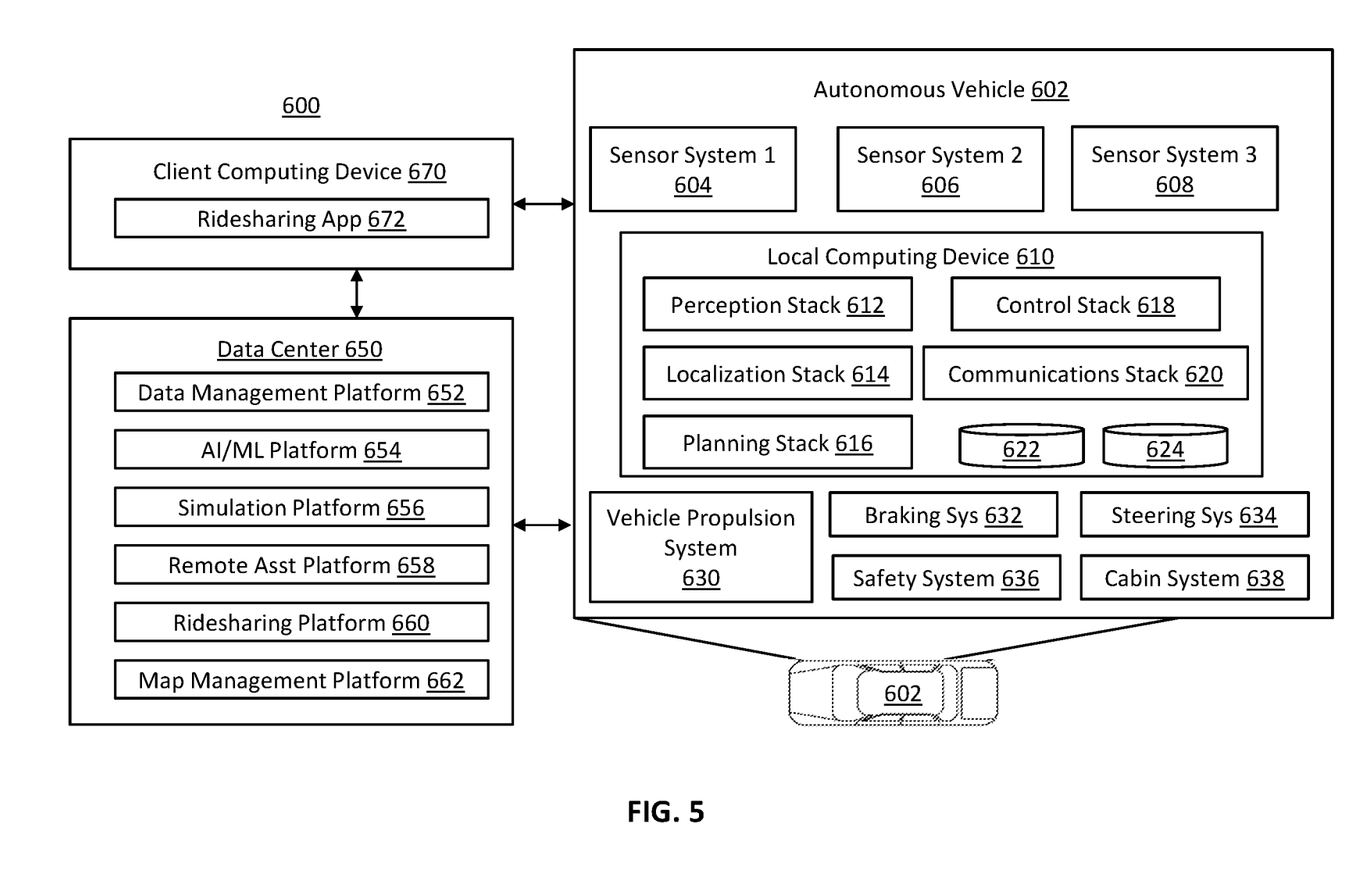
FIG. 5 illustrates an example system environment that may be used to facilitate AV operations, according to some aspects of the disclosed technology.

Turning now to FIG. 5, this figure illustrates an example of an AV management system 600. One of ordinary skill in the art will understand that, for the AV management system 600 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 may navigate about roadways without a human driver based on sensor signals generated by multiple sensor systems 604, 606, and 608. The sensor systems 604-608 may include different types of sensors and may be arranged about the AV 602. For instance, the sensor systems 604-608 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 may be a camera system, the sensor system 606 may be a LIDAR system, and the sensor system 608 may be a RADAR system. Other embodiments may include any other number and type of sensors.

AV 602 may also include several mechanical systems that may be used to maneuver or operate AV 602. For instance, the mechanical systems may include vehicle propulsion system 630, braking system 632, steering system 634, safety system 636, and cabin system 638, among other systems. Vehicle propulsion system 630 may include an electric motor, an internal combustion engine, or both. The braking system 632 may include an engine brake, a wheel braking system (e.g., a disc braking system that utilizes brake pads), hydraulics, actuators, and/or any other suitable componentry configured to assist in decelerating AV 602. The steering system 634 may include suitable componentry configured to control the direction of movement of the AV 602 during navigation. Safety system 636 may include lights and signal indicators, a parking brake, airbags, and so forth. The cabin system 638 may include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 may include one or more client interfaces (e.g., Graphical User Interfaces (GUIs), Voice User Interfaces (VUIs), etc.) for controlling certain aspects of the mechanical systems 630-638.

AV 602 may additionally include a local computing device 610 that is in communication with the sensor systems 604-608, the mechanical systems 630-638, the data center 650, and the client computing device 670, among other systems. The local computing device 610 may include one or more processors and memory, including instructions that may be executed by the one or more processors. The instructions may make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, an High Definition (HD) geospatial database 622, and an AV operational database 624, among other stacks and systems.

Perception stack 612 may enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 may detect and classify objects and determine their current and predicted locations, speeds, directions, and the like. In addition, the perception stack 612 may determine the free space around the AV 602 (e.g., to maintain a safe distance from other objects, change lanes, park the AV, etc.). The perception stack 612 may also identify environmental uncertainties, such as where to look for moving objects, flag areas that may be obscured or blocked from view, and so forth.

Mapping and localization stack 614 may determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 may compare sensor data captured in real-time by the sensor systems 604-608 to data in the HD geospatial database 622 to determine its precise (e.g., accurate to the order of a few centimeters or less) position and orientation. The AV 602 may focus its search based on sensor data from one or more first sensor systems (e.g., GPS) by matching sensor data from one or more second sensor systems (e.g., LIDAR). If the mapping and localization information from one system is unavailable, the AV 602 may use mapping and localization information from a redundant system and/or from remote data sources.

The planning stack 616 may determine how to maneuver or operate the AV 602 safely and efficiently in its environment. For example, the planning stack 616 may receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 may determine multiple sets of one or more mechanical operations that the AV 602 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 may select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 may manage the operation of the vehicle propulsion system 630, the braking system 632, the steering system 634, the safety system 636, and the cabin system 638. The control stack 618 may receive sensor signals from the sensor systems 604-608 as well as communicate with other stacks or components of the local computing device 610 or a remote system (e.g., the data center 650) to effectuate operation of the AV 602. For example, the control stack 618 may implement the final path or actions from the multiple paths or actions provided by the planning stack 616. Implementation may involve turning the routes and decisions from the planning stack 616 into commands for the actuators that control the AV's steering, throttle, brake, and drive unit.

The communication stack 620 may transmit and receive signals between the various stacks and other components of the AV 602 and between the AV 602, the data center 650, the client computing device 670, and other remote systems. The communication stack 620 may enable the local computing device 610 to exchange information remotely over a network, such as through an antenna array or interface that may provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 may also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), BLUETOOTH®, infrared, etc.).

The HD geospatial database 622 may store HD maps and related data of the streets upon which the AV 602 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer may include geospatial information of traffic signal lights, traffic signs, and other road objects and related attributes.

The AV operational database 624 may store raw AV data generated by the sensor systems 604-608 and other components of the AV 602 and/or data received by the AV 602 from remote systems (e.g., the data center 650, the client computing device 670, etc.). In some embodiments, the raw AV data may include HD LIDAR point cloud data, image or video data, RADAR data, GPS data, and other sensor data that the data center 650 may use for creating or updating AV geospatial data as discussed further below with respect to FIG. 5 and elsewhere in the present disclosure.

The data center 650 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 650 may include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 may send and receive various signals to and from the AV 602 and the client computing device 670. These signals may include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 may access data stored by the data management platform 652 to provide their respective services.

The AI/ML platform 654 may provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists may prepare data sets from the data management platform 652; select, design, and train machine learning models; evaluate, refine, and deploy the models; maintain, monitor, and retrain the models; and so on.

The simulation platform 656 may enable testing and validation of the algorithms, machine learning models, neural networks, and other development efforts for the AV 602, the remote assistance platform 658, the ridesharing platform 660, the map management platform 662, and other platforms and systems. The simulation platform 656 may replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 may generate and transmit instructions regarding the operation of the AV 602. For example, in response to an output of the AI/ML platform 654 or other system of the data center 650, the remote assistance platform 658 may prepare instructions for one or more stacks or other components of the AV 602.

The ridesharing platform 660 may interact with a customer of a ridesharing service via a ridesharing application 672 executing on the client computing device 670. The client computing device 670 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 672. The client computing device 670 may be a customer's mobile computing device or a computing device integrated with the AV 602 (e.g., the local computing device 610). The ridesharing platform 660 may receive requests to be picked up or dropped off from the ridesharing application 672 and dispatch the AV 602 for the trip.

Map management platform 662 may provide a set of tools for the manipulation and management of geographic and spatial (geospatial) and related attribute data. The data management platform 652 may receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data may be processed, and map management platform 662 may render base representations (e.g., tiles (2D), bounding volumes (3D), etc.) of the AV geospatial data to enable users to view, query, label, edit, and otherwise interact with the data. Map management platform 662 may manage workflows and tasks for operating on the AV geospatial data. Map management platform 662 may control access to the AV geospatial data, including granting or limiting access to the AV geospatial data based on user-based, role-based, group-based, task-based, and other attribute-based access control mechanisms. Map management platform 662 may provide version control for the AV geospatial data, such as to track specific changes that (human or machine) map editors have made to the data and to revert changes when necessary. Map management platform 662 may administer release management of the AV geospatial data, including distributing suitable iterations of the data to different users, computing devices, AVs, and other consumers of HD maps. Map management platform 662 may provide analytics regarding the AV geospatial data and related data, such as to generate insights relating to the throughput and quality of mapping tasks.

In some embodiments, the map viewing services of map management platform 662 may be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Example Processor-Based Computer System

Figure 6:
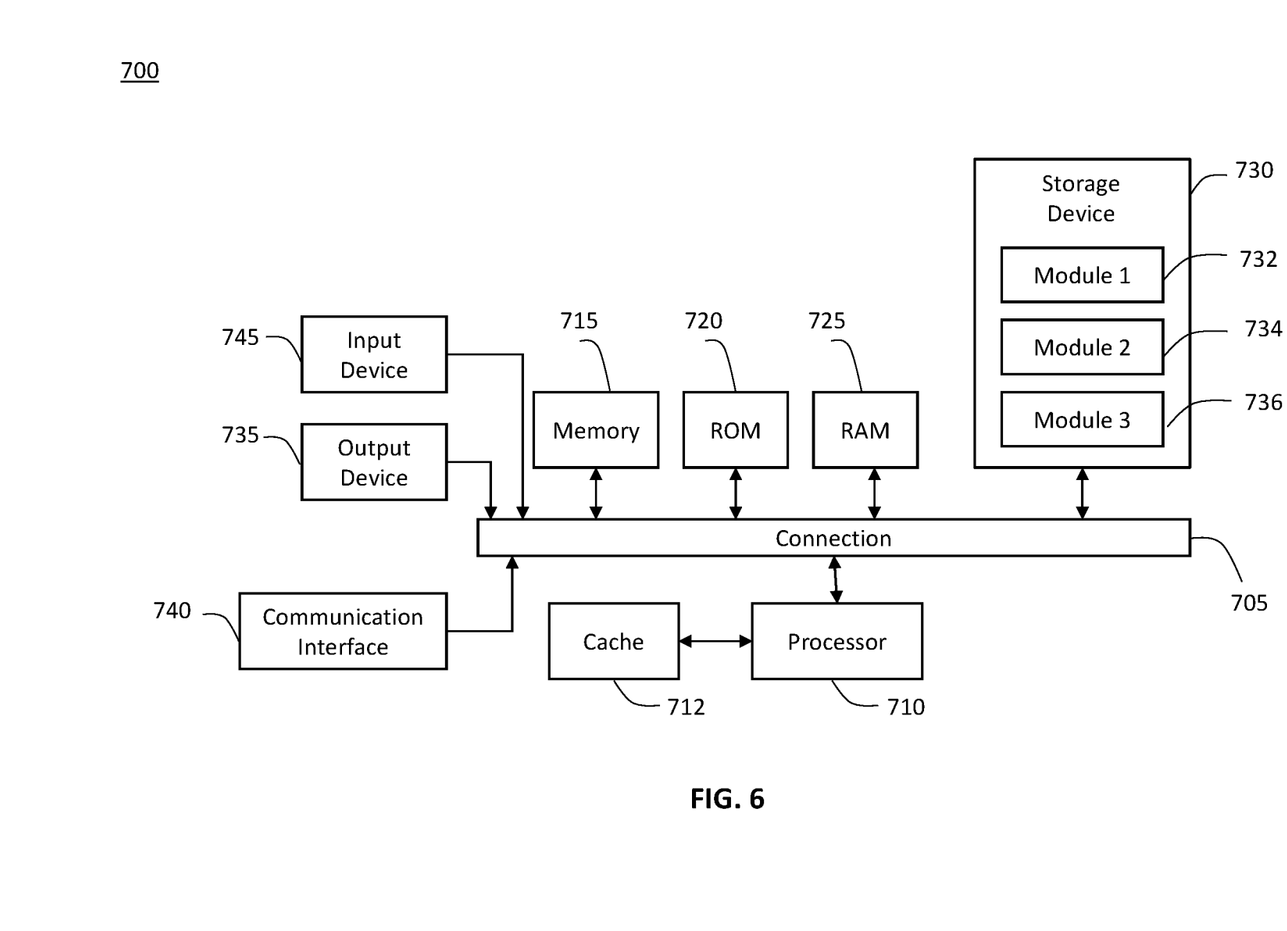
FIG. 6 illustrates an example processor-based system with which some aspects of the subject technology may be implemented.

FIG. 6 illustrates an example processor-based system with which some aspects of the subject technology may be implemented. For example, processor-based system 700 may be any computing device making up, or any component thereof in which the components of the system are in communication with each other using connection 705. Connection 705 may be a physical connection via a bus, or a direct connection into processor 710, such as in a chipset architecture. Connection 705 may also be a virtual connection, networked connection, or logical connection.

In some embodiments, computing system 700 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 700 includes at least one processing unit (CPU or processor) 710 and connection 705 that couples various system components including system memory 715, such as Read-Only Memory (ROM) 720 and Random-Access Memory (RAM) 725 to processor 710. Computing system 700 may include a cache of high-speed memory 712 connected directly with, in close proximity to, or integrated as part of processor 710.

Processor 710 may include any general-purpose processor and a hardware service or software service, such as services 732, 734, and 736 stored in storage device 730, configured to control processor 710 as well as a special purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech, a touch-sensitive screen for gesture or graphical input, keyboard, mouse, motion input, speech, etc. Computing system 700 may also include output device 735, which may be one or more of a number of output mechanisms known to those of skill in the art. In some instances, multimodal systems may enable a user to provide multiple types of input/output to communicate with computing system 700. Computing system 700 may include communications interface 740, which may generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more GNSS receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 may be a non-volatile and/or non-transitory and/or computer-readable memory device and may be a hard disk or other types of computer-readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, RAM, Static RAM (SRAM), Dynamic RAM (DRAM), ROM, Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 may include software services, servers, services, etc., that when the code that defines such software is executed by the processor 710, it causes the system 700 to perform a function. In some embodiments, a hardware service that performs a particular function may include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a computer implemented method that includes retrieving a test to test a software coding rule; submitting the test to a first software compiler, the first software compiler associated with a first vehicle component; submitting the test to second software compiler, the second software compiler associated with a second vehicle component; receiving, from the first software compiler, a first indication of whether the first software compiler compiled the test; receiving, from the second software compiler, a second indication of whether the second software compiler compiled the test; and in response to the first software compiler or the second software compiler compiling the test, generating an alert.

Example 2 provides the computer implemented method of Example 1, where the first vehicle component is a first type of processor for an autonomous vehicle, and the second vehicle component is a second type of processor for the autonomous vehicle, the first type different from the second type.

Example 3 provides the computer implemented method of Example 1, where the first vehicle component is a processor for a first autonomous vehicle having a first set of hardware, the second vehicle component is a processor for a second autonomous vehicle having a second set of hardware, the first set of hardware different from the second set of hardware.

Example 4 provides the computer implemented method of Example 1, further including detecting a software change in the first software compiler; and submitting the test to the first software compiler in response to detecting the software change.

Example 5 provides the computer implemented method of Example 4, further including detecting a second software change in the second software compiler; and submitting the test to the second software compiler in response to detecting the second software change.

Example 6 provides the computer implemented method of Example 1, further including reverting to a previous version of the first software compiler in response to the first software compiler compiling the test.

Example 7 provides the computer implemented method of Example 1, further including retrieving a second test to test a second software coding rule; submitting the second test to the first software compiler; submitting the second test to second software compiler; receiving, from the first software compiler, a third indication of whether the first software compiler compiled the second test; receiving, from the second software compiler, a fourth indication of whether the second software compiler compiled the second test; and in response to the first software compiler or the second software compiler compiling the second test, generating an alert.

Example 8 provides the computer implemented method of Example 7, where a test bank includes the test and the second test, and the method further includes submitting each test in the test bank to the first software compiler and the second software compiler.

Example provides a non-transitory computer-readable medium storing instructions for testing a compiler, the instructions, when executed by a processor, cause the processor to retrieve a test to test a software coding rule; submit the test to a first software compiler, the first software compiler associated with a first vehicle component; submit the test to second software compiler, the second software compiler associated with a second vehicle component; receive, from the first software compiler, a first indication of whether the first software compiler compiled the test; receive, from the second software compiler, a second indication of whether the second software compiler compiled the test; and in response to the first software compiler or the second software compiler compiling the test, generate an alert.

Example 10 provides the computer-readable medium of Example 9, where the first vehicle component is a first type of processor for an autonomous vehicle, and the second vehicle component is a second type of processor for the autonomous vehicle, the first type different from the second type.

Example 11 provides the computer-readable medium of Example 9, where the first vehicle component is a processor for a first autonomous vehicle having a first set of hardware, the second vehicle component is a processor for a second autonomous vehicle having a second set of hardware, the first set of hardware different from the second set of hardware.

Example 12 provides the computer-readable medium of Example 9, the instructions further to detect a software change in the first software compiler; and submit the test to the first software compiler in response to detecting the software change.

Example 13 provides the computer-readable medium of Example 9, the instructions further to revert to a previous version of the first software compiler in response to the first software compiler compiling the test.

Example 14 provides the computer-readable medium of Example 9, the instructions further to retrieve a second test to test a second software coding rule; submit the second test to the first software compiler; submit the second test to second software compiler; receive, from the first software compiler, a third indication of whether the first software compiler compiled the second test; receive, from the second software compiler, a fourth indication of whether the second software compiler compiled the second test; and in response to the first software compiler or the second software compiler compiling the second test, generate an alert.

Example 15 provides the computer-readable medium of Example 14, where a test bank includes the test and the second test, and the method further includes submitting each test in the test bank to the first software compiler and the second software compiler.

Example 16 provides a system for testing a compiler, the system including a memory including a test bank, the test bank including a test to test a software coding rule; and computing circuitry to retrieve the test from the test bank; submit the test to a first software compiler, the first software compiler associated with a first vehicle component; submit the test to second software compiler, the second software compiler associated with a second vehicle component; receive, from the first software compiler, a first indication of whether the first software compiler compiled the test; receive, from the second software compiler, a second indication of whether the second software compiler compiled the test; and in response to the first software compiler or the second software compiler compiling the test, generate an alert.

Example 17 provides the system of Example 16, where the first vehicle component is a first type of processor for an autonomous vehicle, and the second vehicle component is a second type of processor for the autonomous vehicle, the first type different from the second type.

Example 18 provides the system of Example 16, where the first vehicle component is a processor for a first autonomous vehicle having a first set of hardware, the second vehicle component is a processor for a second autonomous vehicle having a second set of hardware, the first set of hardware different from the second set of hardware.

Example 19 provides the system of Example 16, the computing circuitry further to detect a software change in the first software compiler; and submit the test to the first software compiler in response to detecting the software change.

Example 20 provides the system of Example 16, the computing circuitry further to revert to a previous version of the first software compiler in response to the first software compiler compiling the test.

Example 21 includes an apparatus comprising means for performing the method of any of the examples 1-8.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer implemented method comprising:
   retrieving a test comprising code for testing whether a software compiler complies with a software coding rule, wherein the code does not comply with the software coding rule;
   submitting the test to a first software compiler, the first software compiler associated with a first vehicle component;
   submitting the test to a second software compiler, the second software compiler associated with a second vehicle component different from the first vehicle component;
   receiving, from the first software compiler, a first indication of whether the first software compiler compiled the test;

receiving, from the second software compiler, a second indication of whether the second software compiler compiled the test; and in response to the first indication indicating the first software compiler compiled the test or the second indication indicating the second software compiler compiled the test, generating an alert indicating that either one of the first software compiler or the second software compiler does not comply with the software coding rule.

2. The computer implemented method of claim 1, wherein the first vehicle component comprises a first type of processor for an autonomous vehicle, and the second vehicle component comprises a second type of processor for the autonomous vehicle, the first type different from the second type.

3. The computer implemented method of claim 1, wherein the first vehicle component comprises a processor for a first autonomous vehicle having a first set of hardware, the second vehicle component comprises is a processor for a second autonomous vehicle having a second set of hardware, the first set of hardware different from the second set of hardware.

4. The computer implemented method of claim 1, further comprising:
detecting a software change in the first software compiler; and
submitting the test to the first software compiler in response to detecting the software change.

5. The computer implemented method of claim 4, further comprising:
detecting a second software change in the second software compiler; and
submitting the test to the second software compiler in response to detecting the second software change.

6. The computer implemented method of claim 1, further comprising:
reverting to a previous version of the first software compiler in response to the first software compiler compiling the test.

7. The computer implemented method of claim 1, further comprising:
retrieving a second test comprising second code for testing whether a software compiler complies with a second software coding rule;
submitting the second test to the first software compiler;
submitting the second test to the second software compiler;
receiving, from the first software compiler, a third indication of whether the first software compiler compiled the second test;
receiving, from the second software compiler, a fourth indication of whether the second software compiler compiled the second test; and
in response to the third indication indicating the first software compiler compiled the second test or the fourth indication indicating the second software compiler compiled the second test, generating an alert indicating that either one of the first software compiler or the second software compiler does not comply with the second software coding rule.

8. The computer implemented method of claim 7, wherein a test bank includes the test and the second test, and the method further comprises submitting each test in the test bank to the first software compiler and the second software compiler.

9. A non-transitory computer-readable medium storing instructions for testing a compiler, the instructions, when executed by a processor, cause the processor to:
retrieve a test comprising code for testing whether a software compiler complies with a software coding rule, wherein the code does not comply with the software coding rule;
submit the test to a first software compiler, the first software compiler associated with a first vehicle component;
submit the test to a second software compiler, the second software compiler associated with a second vehicle component different from the first vehicle component;
receive, from the first software compiler, a first indication of whether the first software compiler compiled the test;
receive, from the second software compiler, a second indication of whether the second software compiler compiled the test; and
in response to the first indication indicating the first software compiler compiled the test or the second indication indicating the second software compiler compiled the test, generate an alert indicating that either one of the first software compiler or the second software compiler does not comply with the software coding rule.

10. The computer-readable medium of claim 9, wherein the first vehicle component comprises a first type of processor for an autonomous vehicle, and the second vehicle component comprises a second type of processor for the autonomous vehicle, the first type different from the second type.

11. The computer-readable medium of claim 9, wherein the first vehicle component comprises a processor for a first autonomous vehicle having a first set of hardware, the second vehicle component comprises a processor for a second autonomous vehicle having a second set of hardware, the first set of hardware different from the second set of hardware.

12. The computer-readable medium of claim 9, wherein the instructions also cause the processor to:
detect a software change in the first software compiler; and
submit the test to the first software compiler in response to detecting the software change.

13. The computer-readable medium of claim 9, wherein the instructions also cause the processor to:
revert to a previous version of the first software compiler in response to the first software compiler compiling the test.

14. The computer-readable medium of claim 9, wherein the instructions also cause the processor to:
retrieve a second test comprising second code for testing whether a software compiler complies with a second software coding rule;
submit the second test to the first software compiler;
submit the second test to the second software compiler;
receive, from the first software compiler, a third indication of whether the first software compiler compiled the second test;
receive, from the second software compiler, a fourth indication of whether the second software compiler compiled the second test; and
in response to the third indication indicating the first software compiler compiled the second test or the fourth indication indicating the second software compiler compiled the second test, generate an alert indicating that either one of the first software compiler or the second software compiler does not comply with the second software coding rule.

15. The computer-readable medium of claim 14, wherein a test bank includes the test and the second test, and wherein the instructions also cause the processor to submit each test in the test bank to the first software compiler and the second software compiler.

16. A system for testing a compiler, the system comprising:
 a memory storing a test bank, the test bank comprising a test comprising code for testing whether a software compiler complies with a software coding rule, wherein the code does not comply with the software coding rule; and
 computing circuitry configured to:
  retrieve the test from the test bank;
  submit the test to a first software compiler, the first software compiler associated with a first vehicle component;
  submit the test to a second software compiler, the second software compiler associated with a second vehicle component different from the first vehicle component;
  receive, from the first software compiler, a first indication of whether the first software compiler compiled the test;
  receive, from the second software compiler, a second indication of whether the second software compiler compiled the test; and
  in response to the first indication indicating the first software compiler compiled the test or the second indication indicating the second software compiler compiled the test, generate an alert indicating that either one of the first software compiler or the second software compiler does not comply with the software coding rule.

17. The system of claim 16, wherein the first vehicle component comprises a first type of processor for an autonomous vehicle, and the second vehicle component comprises a second type of processor for the autonomous vehicle, the first type different from the second type.

18. The system of claim 16, wherein the first vehicle component comprises a processor for a first autonomous vehicle having a first set of hardware, the second vehicle component comprises a processor for a second autonomous vehicle having a second set of hardware, the first set of hardware different from the second set of hardware.

19. The system of claim 16, wherein the computing circuitry is also configured to:
 detect a software change in the first software compiler; and
 submit the test to the first software compiler in response to detecting the software change.

20. The system of claim 16, wherein the computing circuitry is also configured to:
 revert to a previous version of the first software compiler in response to the first software compiler compiling the test.

* * * * *